United States Patent
Suh et al.

(10) Patent No.: US 12,063,081 B2
(45) Date of Patent: Aug. 13, 2024

(54) TX MU-MIMO CAPABILITY FOR MCS

(71) Applicant: HUAWEI TECHNOLOGIES CO., LTD., Shenzhen (CN)

(72) Inventors: Jung Hoon Suh, Kanata (CA); Yan Xin, Kanata (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/669,575

(22) Filed: Feb. 11, 2022

(65) Prior Publication Data

US 2022/0263547 A1 Aug. 18, 2022

Related U.S. Application Data

(60) Provisional application No. 63/149,758, filed on Feb. 16, 2021.

(51) Int. Cl.
*H04B 7/0452* (2017.01)
*H04B 7/0417* (2017.01)
*H04L 5/00* (2006.01)

(52) U.S. Cl.
CPC ......... *H04B 7/0452* (2013.01); *H04B 7/0417* (2013.01); *H04L 5/0014* (2013.01); *H04L 5/0048* (2013.01)

(58) Field of Classification Search
CPC .. H04B 7/0452; H04B 7/0417; H04B 7/0628; H04L 5/0014; H04L 5/0048; H04L 1/0003; H04L 1/0009; H04L 1/0025
See application file for complete search history.

(56) References Cited

U.S. PATENT DOCUMENTS

| | | | |
|---|---|---|---|
| 9,397,737 B2* | 7/2016 | Seok | H04B 7/0452 |
| 11,641,660 B2* | 5/2023 | Kwon | H04B 7/0628 |
| | | | 370/230 |
| 2011/0116488 A1* | 5/2011 | Grandhi | H04B 7/0658 |
| | | | 370/328 |

(Continued)

FOREIGN PATENT DOCUMENTS

| | | |
|---|---|---|
| CN | 107925473 A | 4/2018 |
| WO | 2020228535 A1 | 11/2020 |

OTHER PUBLICATIONS

Wook Bong Lee, et al., "Considerations on Capabilities and Operation Mode: MU-MIMO", 11-21/102r2, IEEE TGbe, Jan. 2021.

(Continued)

*Primary Examiner* — Vineeta S Panwalkar

(57) ABSTRACT

A method of communication between a first node and a second node operating in a communications network. The method includes sending, by the first node, to the second node, a first transmission to configure a communication channel between the first node and the second node. The first transmission includes a first frame including a first capability indicator. The first capability indicator indicates a first MU-MIMO capability of a transmitter of the first node. The first multi-user (MU)-MIMO capability includes a first Modulation and Coding Scheme (MCS) processable by the first node or a first number of spatial streams (NSS) processable by the first node.

20 Claims, 10 Drawing Sheets

(56) References Cited

U.S. PATENT DOCUMENTS

| | | | |
|---|---|---|---|
| 2013/0336306 A1* | 12/2013 | Sohn | H04B 7/0877 370/338 |
| 2014/0086131 A1* | 3/2014 | Seok | H04W 52/0225 370/311 |
| 2015/0312877 A1* | 10/2015 | Bhanage | H04W 4/029 455/456.5 |
| 2017/0171796 A1* | 6/2017 | Wu | H04W 48/16 |
| 2017/0294953 A1* | 10/2017 | Ghosh | H04B 7/0452 |
| 2017/0302401 A1* | 10/2017 | Gao | H04B 7/0452 |
| 2019/0349067 A1* | 11/2019 | Huang | H04W 72/046 |
| 2020/0112350 A1 | 4/2020 | Yang et al. | |
| 2020/0213867 A1 | 7/2020 | Nemavat | |
| 2020/0267741 A1 | 8/2020 | Kwon et al. | |
| 2020/0358486 A1 | 11/2020 | Suh et al. | |
| 2021/0028834 A1 | 1/2021 | Qian et al. | |

OTHER PUBLICATIONS

Junghoon Suh, et. al., "Systems and Methods for Capability Indication for a Wireless Receiving Station" U.S. Appl. No. 16/855,738, filed Apr. 22, 2020.

* cited by examiner

| Bits: | B0 | B1 B2 | B3 B4 | B5 B6 | B7 B8 | B9 B10 | B11 B12 | B13 B14 B15 |
|---|---|---|---|---|---|---|---|---|
| | | Max EHT-MCS For 1 SS | Max EHT-MCS For 2 SS | Max EHT-MCS For 3 SS | Max EHT-MCS For 4 SS | Max EHT-MCS For 5 SS | Max EHT-MCS For 6 SS | Max EHT-MCS For 7 SS | Max EHT-MCS For 8 SS |
| | | 2 | 2 | 2 | 2 | 2 | 2 | 2 | 2 |

602

| Bits: | B16 | B17 B18 | B19 B20 | B21 B22 | B23 B24 | B25 B26 | B27 B28 | B29 B30 B31 |
|---|---|---|---|---|---|---|---|---|
| | Max EHT-MCS For 9 SS | Max EHT-MCS For 10 SS | Max EHT-MCS For 11 SS | Max EHT-MCS For 12 SS | Max EHT-MCS For 13 SS | Max EHT-MCS For 14 SS | Max EHT-MCS For 15 SS | Max EHT-MCS For 16 SS |
| | 2 | 2 | 2 | 2 | 2 | 2 | 2 | 2 |

TX MU-MIMO CAPABILITY FOR MCS

CROSS-REFERENCE TO RELATED APPLICATIONS

This application claims the benefit of and priority to U.S. Provisional Application Ser. No. 63/149,758 filed Feb. 16, 2021, the entire contents of which are hereby incorporated by reference.

FIELD OF THE INVENTION

The present application relates to wireless communication systems having a plurality of wireless transmitting communication devices that collaborate to transmit information to one or more wireless receiving communication devices.

BACKGROUND

The IEEE 802.11 wireless local area networking (WLAN) standard defines one of the most widely deployed wireless technologies in the world. The popularity of wireless networking is driven by the ubiquity of portable mobile handheld devices, and the convenience of untethered communications. With the increasing deployment of multimedia content on the Internet—such as digital video, voice over IP (VoIP), videoconferencing, and real-time applications such as multi-player networked games—along with the deployment of time-sensitive critical applications, there is a strong motivation to support multiple devices, minimize interference between the devices, and improve quality of service to meet more stringent performance requirements.

Wireless local area network (WLAN) communication systems include wireless communication devices that transmit and receive signals, including access points (APs), that function as an interface between the WLAN and one or more further networks, and stations (STA) that exchange signals with the APs.

In some cases, a plurality of APs may work in collaboration to communicate with one or more STAs in a WLAN. For example, the proposed IEEE 802.11be standard is being developed to support a next generation of Extremely High Throughput (EHT) WLAN. EHT communication may be achieved with AP collaboration, which can utilize coordination between multiple APs to minimize interference and improve quality of service for communications with STAs.

In some cases, in a multi-user (MU) scenario, where multiple STAs are receiving signal streams from one or more access points (APs), a STA may not be able to support certain multi-input multi-output (MIMO) modulation and coding schemes (MCS).

It has been proposed that receiver capabilities of STAs and APs be communicated as part of a sounding procedure during communications where receive capabilities include MCS capabilities. However, the maximum supportable MCS for MU-MIMO communications is not affected only by the RX capability, but by the TX capability as well such as Precoding algorithm.

Therefore, in order to achieve improvements in an MU-MIMO communications with a plurality of STAs, there is a need for a method and apparatus for management of data transmission resources that is not subject to one or more limitations of the prior art.

BRIEF SUMMARY

An object of embodiments of the present invention is to provide a method and apparatus for managing data transmission resources in wireless communication networks that may use different modulation and coding schemes (MCS). Communicating transmitter capabilities defined herein, between APs and STAs allows for the optimization of communication channels in MU-MIMO configurations, improving the performance of precoders.

Embodiments of the present invention facilitate MU-MIMO communications by indicating supported transmitter MCS in a management frame such as Beacon Frame or Association Response Frame. New subfields called "MU-MIMO Tx EHT-MCS Map" are introduced into Supported HE-MCS and NSS Set fields of these frames, but the name of the subfield can be changed. Furthermore, since the performance of MU-MIMO may be impacted by Precoder algorithms, a new subfield called "MU-MIMO Tx EHT-MCS Map" may be introduced into Supported HE-MCS and NSS Set fields.

In accordance with embodiments of the present invention, there is provided a method of communication between a first node and a second node operating in a communications network. The method includes sending, by the first node, to the second node, a first transmission to configure a communication channel between the first node and the second node. The first transmission including a first frame including a first capability indicator. The first capability indicator indicates a first multi-user (MU)-MIMO capability of a transmitter of the first node. The first MU-MIMO capability includes a first Modulation and Coding Scheme (MCS) processable by the first node or a first number of spatial streams (NSS) processable by the first node.

This provides the technical benefit of allowing for the MU-MIMO Tx Capability, such as the for the maximum supportable MCS, of a network node such as a STA or AP to be communicated from a transmitting node to a receiving node.

Further embodiments include receiving, by the first node, a second transmission from the second node. The second transmission includes a second frame including a second capability indicator for indicating a second MU-MIMO capability of a transmitter of the second node. The second MU-MIMO capability includes a second Modulation and Coding Scheme (MCS) processable by the second node or a second number of spatial streams (NSS) processable by the second node.

This provides the technical benefit of allowing for the MU-MIMO Tx Capability, such as the for the maximum supportable MCS, of a network node such as a STA or AP to be communicated bidirectionally between two network nodes.

In further embodiments, the first frame comprises a Beacon frame, the first node is an access point (AP), and the second node is a station (STA).

In further embodiments, the first frame comprises an Association Response frame, the first node is a station (STA), and the second node is an access point (AP).

In further embodiments, the first frame comprises a null data packet announcement (NDPA) frame.

In further embodiments, the first frame comprises a channel state information (CSI) feedback (FB) action frame.

In further embodiments, the first frame comprised an Extremely High-Throughput (EHT) Compressed Beam Forming (BF) Action frame.

In further embodiments, the first capacity indicator or the second capacity indicator includes one of a minimum mean square error (MMSE) detection algorithm, a maximum-likelihood detection (MLD) algorithm, or a sphere decoding (SD) algorithm.

In further embodiments, the first MU-MIMO capability includes a transmitter MCS for a spatial stream.

In accordance with embodiments of the present invention, there is provided a network node configured to communicate with a second network node operating in a communications network. The network node includes a processor coupled to a network interface and a computer readable storage medium. The storage medium stores instructions executable by the processor to send to the second node, a first transmission to configure a communication channel between the network node and the second node. The first transmission includes a first frame including a first capability indicator. The first capability indicator indicates a first multi-user (MU)-MIMO capability of a transmitter of the network node. The first MU-MIMO capability includes a first Modulation and Coding Scheme (MCS) processable by the network node or a first number of spatial streams (NSS) processable by the network node.

In an embodiment, the storage medium store instructions executable by the processor to further instruct the network node to receive, a second transmission from the second node. The second transmission includes a second frame including a second capability indicator for indicating a second MU-MIMO capability of a transmitter of the second node. The second MU-MIMO capability includes a second Modulation and Coding Scheme (MCS) processable by the second node or a second number of spatial streams (NSS) processable by the second node.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Reference will now be made, by way of example, to the accompanying drawings which show example embodiments of the present application, and in which:

FIG. 6 illustrates an MU-MIMO Tx EHT-MCS Map, according to an embodiment.

Similar reference numerals may have been used in different figures to denote similar components.

DETAILED DESCRIPTION

An object of embodiments of the present invention is to provide a method and apparatus for managing data transmission resources in wireless communication networks that may use different modulation and coding schemes (MCS). Communicating transmitter capabilities defined herein, between APs and STAs allows for the optimization of communication channels in MU-MIMO configurations, improving the performance of precoders.

Embodiments communicate high level TX capability indication for the supported MCS in MU-MIMO transmissions and may communicate the TX capability using the Supported EHT-MCS and NSS Set fields of the EHT PHY Capabilities Information field used to describe PHY capabilities of IEEE 802.11 compliant wireless devices. In other embodiment, the MU-MIMO TX Capability indication may be communicated in the NDPA and CSI FB Action Frame during the sounding process between APs and STAs.

Figure 1:
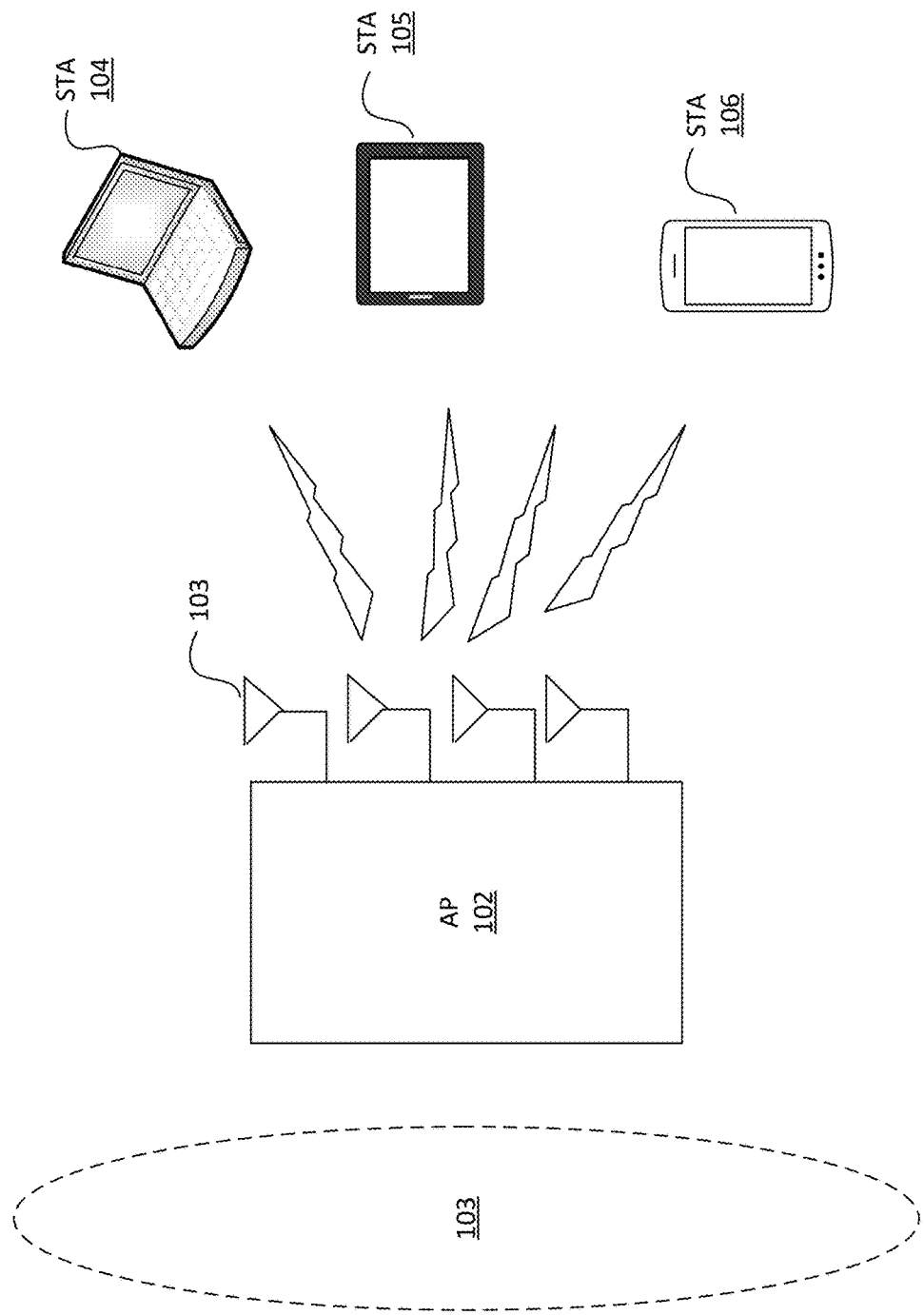
FIG. 1 is a block diagram illustrating communications between an access points (AP) and multiple stations (STAs), according to an embodiment.

FIG. 1 shows a wireless local area network (WLAN) that includes a plurality of wireless communication devices configured to transmit and receive wireless signals according to example embodiments. The wireless communication devices include at least one access point (AP) 102 and stations (STAs) 104, 105, and 106. An AP 102 may also be referred to as a wireless transmitting station or device. In embodiments, AP 102 is configured to function as an interface between one or more STAs, such as 104, 105, and 106, and one or more further networks 103. Each STA is associated through an authentication and association procedure with AP 102. In some embodiments, AP 102 may coordinate with other APs (not shown) to operate collaboratively as a group in an AP collaboration mode. AP 102 collects channel state information (CSI) from all the STAs 104, 105, and 106 that are associated with AP 102.

There has been interest in including support in the IEEE 802.11 family of standards to enable Extremely High Throughput (EHT) wireless communications. For example, EHT operations beyond 160 MHz bandwidth may be considered.

In embodiments described herein, frame formats specified in the IEEE 802.11ax and IEEE 802.11ac standards (that respectively support High Efficiency (HE) WLAN communications and Very High Throughput (VHT) WLAN communications) are modified to support 16 Spatial Streams for one or more APs in EHT WLAN communications. For example, one or more of the probe request frames, association request frame, Compressed Beamforming Report Action frame, beacon frame, and association response frame formats specified in the IEEE 802.11ax standard can be modified to facilitate coordination of APs 102 and STAs 104, 105, and 106 in an AP collaboration mode that supports EHT WLAN communications.

As shown in FIG. 1, AP 102 may communicate with multiple STAs 104, 105, and 106 in a WLAN. In some embodiments, AP 102 and STAs 104, 105, and 106 may communicate through multi-user (MU) multi-input and multi-output (MIMO) technology, whereby one AP 102 can communicate with multiple STAs simultaneously in a 5 GHz Wi-Fi frequency band (or possibly a higher Wi-Fi frequency band such as 6 GHz), which greatly improves the network speed and help alleviates congestion on a busy network. IEEE 802.11ac (VHT), IEEE 802.11ax (HE) and IEEE 802.11be (EHT, currently being proposed) standards are compatible with MU-MIMO. Under the proposed EHT standards, up to total 16 spatial streams (e.g. with one AP having sixteen antennas or four APs, each having four antennas) can be transmitted from an AP 102 to STAs 104, 105, and 106 in an MU-MIMO network.

Because AP 102 may have multiple antennas 103, a STA may receive, simultaneously or near simultaneously, multiple signal streams from AP 102. In order to adapt data transmissions to current channel conditions, it is necessary for AP 102 to know various channel properties of a communication link between AP 102 and a particular STA 104. The channel properties of the communication link may be referred to as channel state information (CSI). The CSI describes how a signal propagates from the transmitter (which may be either AP 102 or STA 104) to the receiver (which may be either STA 104 or AP 102) and represents the combined effect of, for example, scattering, fading, and power decay with distance. The CSI information may include a feedback matrix that is included in a compressed beamforming report (CBR) sent by a STA 104 to AP 102. In some embodiments, the feedback matrix may be calculated by STA 104 based at least in part on information sent to STA 104 by AP 102. The process to learn and estimate such channel properties is known as a channel sounding process or simply a sounding process.

Figure 2:
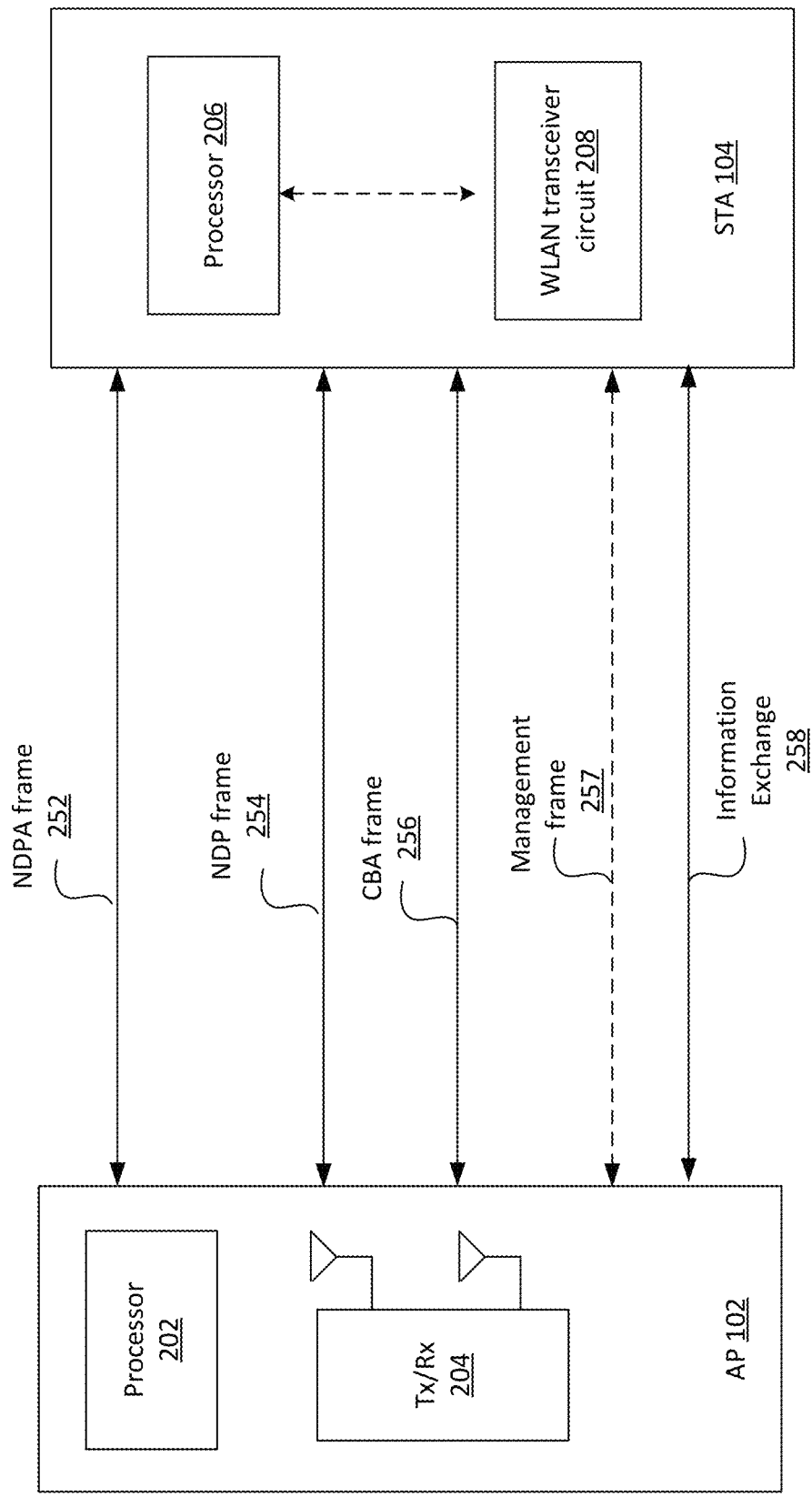
FIG. 2 is a block diagram illustrating communications including a sounding process between an AP and a STA, according to an embodiment.

FIG. 2 illustrates an example schematic diagram showing an AP 102 in communication with a STA 104 according to an embodiment. An example AP 102 includes at least a processor 202 and a wireless local area network (WLAN) transceiver circuit 204. An example STA 104 includes at least a processor 206 and a WLAN transceiver circuit 208 (e.g., a Wi-Fi transceiver) for exchanging signals through a wireless interface with the WLAN transceiver circuit 204 of AP 102.

FIG. 2 also illustrates a set of example signals that may be communicated for performing a channel sounding process between AP 102 and STA 104. An AP 102 intending to communicate with a STA 104 initiates a channel sounding process by sending a null data packet announcement (NDPA) frame 252 to STA 104, as described below. The primary purpose of the NDPA frame 252 is to carry a STA info field for each target STA 104. If an AP 102 intends to communicate with multiple target STAs 104, 105, and 106, AP 102 can broadcast the same NDPA frame 252 to all the STAs in the WLAN. The broadcast NDPA frame 252 includes some fields common and applicable to all the target STAs 104, 105, and 106, and a separate STA information field for each of the target STAs. AP 102 may send a NDPA frame 252 to all target STAs 104, 105, and 106. A STA 104 in the network may receive a NDPA frame 252 but determine that it is not an intended target STA based on the information in the NDPA frame 252. The STAs 104 not identified by a NDPA frame 252 sent by AP 102 may simply defer channel access for the AP until the sounding process is completed.

Following the NDPA frame 252 and a short interframe space (SIFS) period, AP 102 transmits a further signal, which carries a null data packet (NDP) frame 254, to each of the target STAs 104, 105, and 106. The NDP frame 254 generally has no data field and includes training fields that contain symbols which will be used by the target STA(s) to generate a compressed beamforming action (CBA) frame 256 that includes a compressed beamforming report (CBR).

If a STA 104 is designated as a target STA 104 by AP 102, then the CBA frame 256 may include a CBR for the AP 102 and the CBR includes a feedback matrix. The feedback matrix is calculated by STA 104 based on information received in the NDPA frame 252 and NDP frame 254, and may take the form of a sequence of angles in a compressed form. Once STA 104 has generated the CBA frame 256, it transmits the CBA frame 256 back to AP 102. Appropriate information exchange 258 between the AP 102 and the STA 104 may then take place.

As noted above, following the NDPA frame 252, one or more NDP frames 254 are transmitted from AP 102 to one or more target STAs 104-106. Each STA 104-106 can utilize the training fields (e.g., Long Training Fields) included in its respective NDP frame 254 to calculate a specific channel response. The STA 104 can then use the specific channel response information to determine CSI to include in a CBR for the NDP frame 254. The CBR is then included in a CBA frame 256 and transmitted by the STA 104 to provide CSI feedback (FB) to AP 102. For example, the CBR included in CBA frame 256 can be extracted and used by the AP 102 to calculate a BF steering matrix to direct transmission towards the specific STA 104 during the information exchange or data transmission 258.

In some embodiments, after gathering all the CBA frames 256, each collaborating AP 102 can transmit a beamformed data frame (not shown in FIG. 2) with multiple data streams to the target STAs 104-106. If the STAs 104-106 correctly decode the data, the STAs 104-106 send back an acknowledgement (ACK) (not shown in FIG. 2) frame to the AP 102, after which the AP 102 may begin information exchange 258.

As described above, under the proposed EHT standards, up to total 16 spatial streams can be transmitted from an AP 102 or a plurality of APs to STAs 104-106 in an MU-MIMO network. For example, in a MU-MIMO network, multiple signal streams, carrying multiple spatial streams based on spatial multiplexing, from a single AP 102 or a plurality of APs may superimpose, and the signals from the different antennas interfere with each other. This requires the STAs 104-106 that have received the multiple spatial streams to perform MIMO detection, which is the process to detect and separate multiple spatial streams from one another where interference may be high. The complexity of the MIMO detection process increases when the number of transmitting antennas, and thus the number of simultaneous spatial streams, increases. In the case of a sufficiently large number of transmitted spatial streams (e.g., 16 spatial streams), the MIMO detection problem becomes very complex and requires each STA 104 in the network to process an advanced MIMO detection algorithm in order to detect and process the transmitted spatial streams properly.

Therefore, when a STA 104 in the network cannot perform a MIMO detection with an advanced MIMO detection algorithm, STA 104 would not be able to properly process the transmitted spatial streams, and thus the available resources offered by the up to 16 spatial streams cannot be fully utilized in a MU-MIMO network. This MIMO detection problem is illustrated in the example experiment below, where it is shown that simple MIMO detection algorithm does not perform as well as the advanced MIMO detection algorithm in a scenario where a sufficiently large number of spatial streams are transmitted in a MU-MIMO setting.

In some embodiments, a CBA frame 256 may be used to indicate a capability of a STA 104 in a MU-MIMO scenario.

For example, a reserved field in a MIMO control field in CBA frame 256 may be used to indicate a capability of STA 104, further described below.

As mentioned earlier, in alternative embodiments, STA 104 can send a separate feedback signal carrying a management frame 257 to AP 102 for indicating a capability of STA 104.

Therefore, in an embodiment, AP 102 can send a signal for a STA 104 in the plurality of STAs 104-106 to initiate a channel sounding process for a communication channel between AP 102 and STA 104. AP 102 then receives a feedback signal from STA 104, the feedback signal carrying a frame, which includes a capability indicator for indicating a capability of STA 104. The frame may be a CBA frame 256 or a different frame, such as a management frame 257. For example, the feedback signal may carry a probe request frame or an association request frame 257 from STA 104 to AP 102 during an association process. The probe request frame or the association request frame 257 can include a capability indicator for indicating a capability of STA 104.

Figure 3:
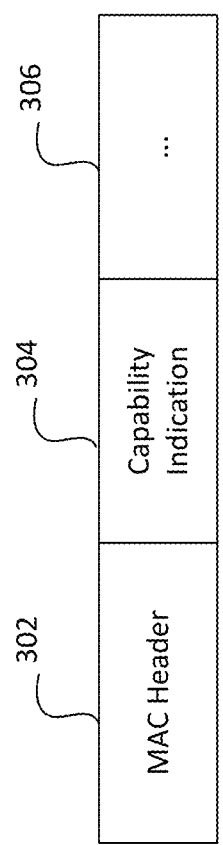
FIG. 3 illustrates an example management frame format according to an example embodiment, according to an embodiment.

The management frame 257 may be transmitted by STA 104 before the CBA frame 156. FIG. 3 shows an embodiment of a management frame in the form of an association request frame 257, which includes a plurality of fields 302, 304, 306. Fields 302 include fields in a MAC header, including frame control, duration, BSSID, and so on. Capability indication field 304, which may be part of the frame body, may be used to indicate the capability of STA 104, such as the capability to process one or more Modulation and Coding Set (MCS) or one or more MIMO detection algorithms. Capability indication field 304 may indicate a maximum computational complexity of the STA 104, which means a maximum computational complexity that can be handled by STA 104. Field(s) 306 may include one or more fields in a frame body, such as for example session ID.

Alternatively, or concurrently, the capability indication field 304 may be used to indicate the capability of STA 104 to implement or use one or more MIMO detection algorithms, such as one or more of: minimum mean square error (MMSE) detection algorithm, maximum-likelihood detection (MLD) algorithm, sphere decoding (SD) algorithm, and so on. In other embodiments, capability indication field 304 may be used to indicate a level of computational complexity that can be handled by STA 104.

In some example embodiments, once AP 102 has received the frame including a capability indicator such as a capability indication field 304, the AP processes the capability indication field 304 in the frame to determine at least one of the following: a Modulation and Coding Set (MCS) that may be transmitted by STA 104, a MIMO detection algorithm processable by STA 104, and a maximum computational complexity that can be handled by the receiving STA 104. The AP, based on the capabilities of STA 104, may then generate a response to STA 104 accordingly. For example, if the frame sent by STA 104 is an association request frame 257, AP 102 may receive and analyze frame 257 to determine that STA 104 can process a MCS of 256 QAM or a MLD detection algorithm. In this case, AP 102 may determine that the capability of STA 104 meets a minimum requirement for effective communication between AP 102 and a STA, and further generate an association response to STA 104 to facilitate an association process with STA 104. The association response includes, for example, an association ID for STA 104.

If AP 102 determines, based on the capability of STA 104, that STA 104 fails to meet the minimum requirement for effective communication, it may generate and transmit a response back to STA 104 refusing the association request. The minimum requirement may be pre-determined by AP 102 or manually by a network administrator.

In some embodiments, the capability indication for a MCS includes an index value for the MCS. For example, in 802.11n networks, the MCS index goes from 0 to 31, while in 802.11ac networks, the MCS index goes from 0 to 9 for each number of spatial streams.

In some embodiments, the capability indication for a MCS may include a modulation type, a coding rate, or both. For example, a modulation type can be frequency-division multiplexing (FDM), orthogonal frequency-division multiplexing (OFDM), binary phase shift keying (BPSK), quadrature phase shift keying (QPSK), quadrature amplitude modulation (QAM) or direct-sequence spread spectrum (DSSS), to name a few. A coding rate (or code rate), often expressed as information bits per coded bit, can provide an indication of how much of a data stream is being used to transmit usable information. A modulation type may be associated with a corresponding coding rate, which may range from ½ to ⅚ depending on the specific modulation scheme.

Even though example embodiments herein describe single-AP scenario in a MU-MIMO environment, a person reasonably skilled in the art may appreciate that the capability indicator may also be implemented for multi-AP scenario, where multiple APs may collaborate and transmit multiple spatial streams to multiple STAs.

Figure 4:
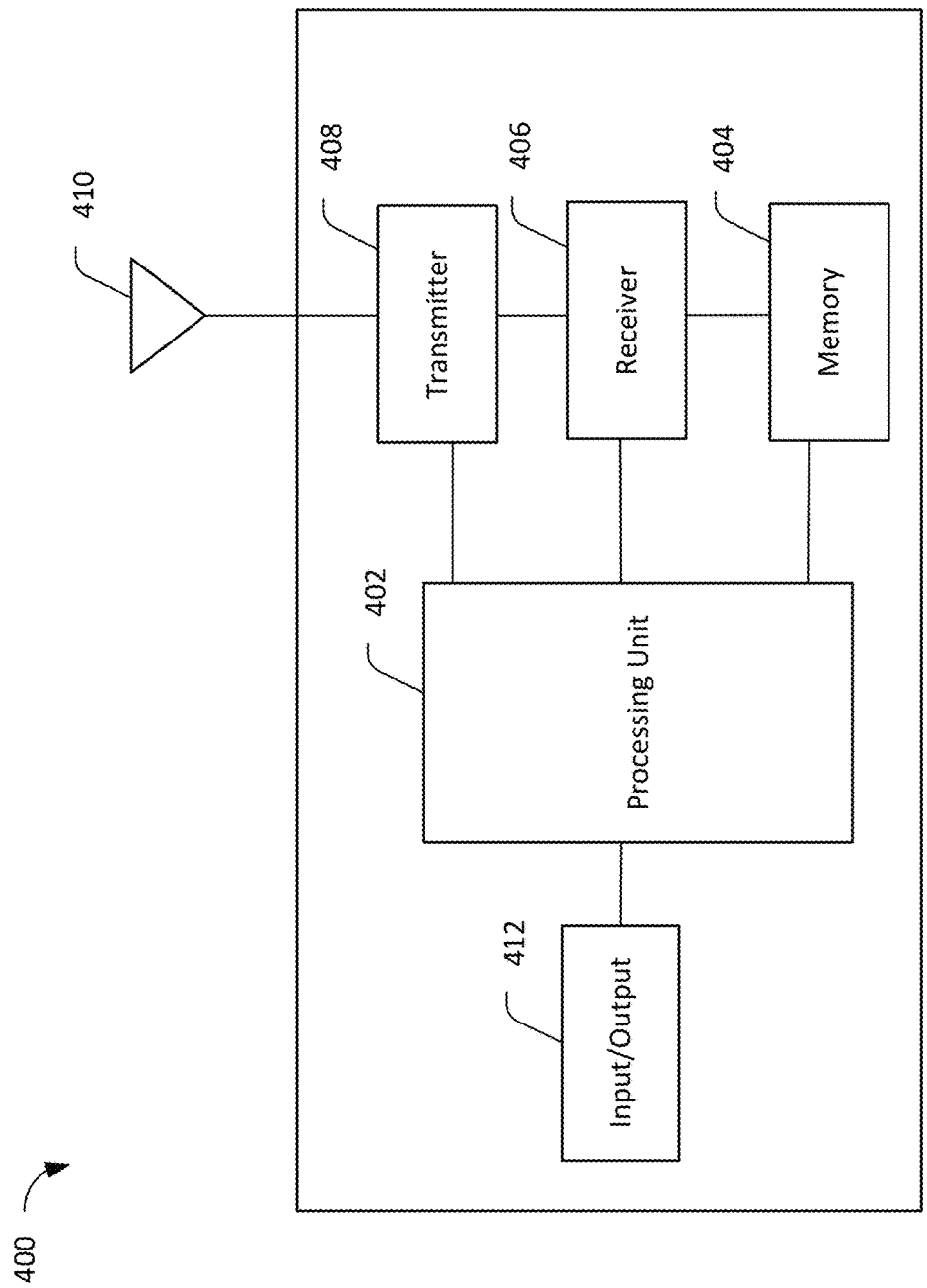
FIG. 4 is a block diagram illustrating an example electronic device that may act as an AP or receiving STA, according to an embodiment.

FIG. 4 shows an example transceiving apparatus 400 that may act as an AP 102 or as a STA 104-106. Apparatus 400 includes at least one processing unit 402, at least one transmitter 408, at least one receiver 406, one or more antennas 410, at least one memory 404, and one or more input/output devices or interfaces 412. The processing unit 402 (which may include processor 206 in the case of STAs 104-106, or processor 202 in the case of AP 102) implements various processing operations of AP 102 or the receiving STAs 104-106, such as signal coding, data processing, power control, input/output processing, or any other functionality. The processing unit 402 can also be configured to implement some or all of the functionality and embodiments described herein. Each processing unit 402 includes any suitable processing or computing device configured to perform one or more operations. Each processing unit 402 can, for example, include a microprocessor, microcontroller, digital signal processor, field programmable gate array, or application specific integrated circuit.

The transmitter 408 and receiver 406 may collectively be used to implement WLAN transceiver circuit 208 in the case of STA 104-106 or WLAN transceiver circuit 204 in the case of AP 102. Each transmitter 408 includes any suitable structure for generating signals for wireless or wired transmission. Each receiver 406 includes any suitable structure for processing signals received wirelessly or by wire. Although shown as separate components, at least one transmitter 408 and at least one receiver 406 could be combined into a transceiver. Each antenna 410 includes any suitable structure for transmitting and receiving wireless or wired signals. Although a common antenna 410 is shown here as being coupled to both the transmitter 408 and the receiver 406, one or more antennas 410 could be coupled to the transmitter(s) 408, and one or more separate antennas 410 could be coupled to the receiver(s) 406. In some examples, one or more antennas 410 may be an antenna array, which may be used for beamforming and beam steering operations.

Each memory 404 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The memory 404 stores instructions and data used, generated, or collected by AP 102 or STA 104-106. For example, the memory 404 could store software instructions or modules configured to implement some or all of the functionality and/or embodiments described herein and that are executed by the processing unit(s) 402.

Each input/output device/interface 412 permits interaction with a user or other devices in the network. Each input/output device/interface 412 includes any suitable structure for providing information to or receiving/providing information from a user, including network interface communications.

In embodiments, a transmitter capability indication is communicated over the communications channel between AP 102 and STA 104-106. The transmitter MU-MIMO TX Capability indication may be transmitted in a subfield, referred to as a "MU-MIMO Tx EHT-MCS Map." This transmitter information may be used to optimize MU-MIMO communications since the maximum supportable MCSs is affected by TX capability as well such as Precoding algorithm.

The Supported EHT-MCS and NSS Set field indicates the combinations of EHT-MCSs and spatial streams that a wireless node supports for reception and the combinations that it supports for transmission. In embodiments, the MU-MIMO Tx EHT-MCS Map may be transmitted in the Supported EHT-MCS and NSS Set field.

In other embodiment, the MU-MIMO Tx EHT-MCS Map may be communicated in the NDPA and CSI FB Action Frame during the sounding process. In further embodiment, the MU-MIMO TX Capability indication may be transmitted between AP 102 and STA 104 by other means as known in the art.

Figure 5:
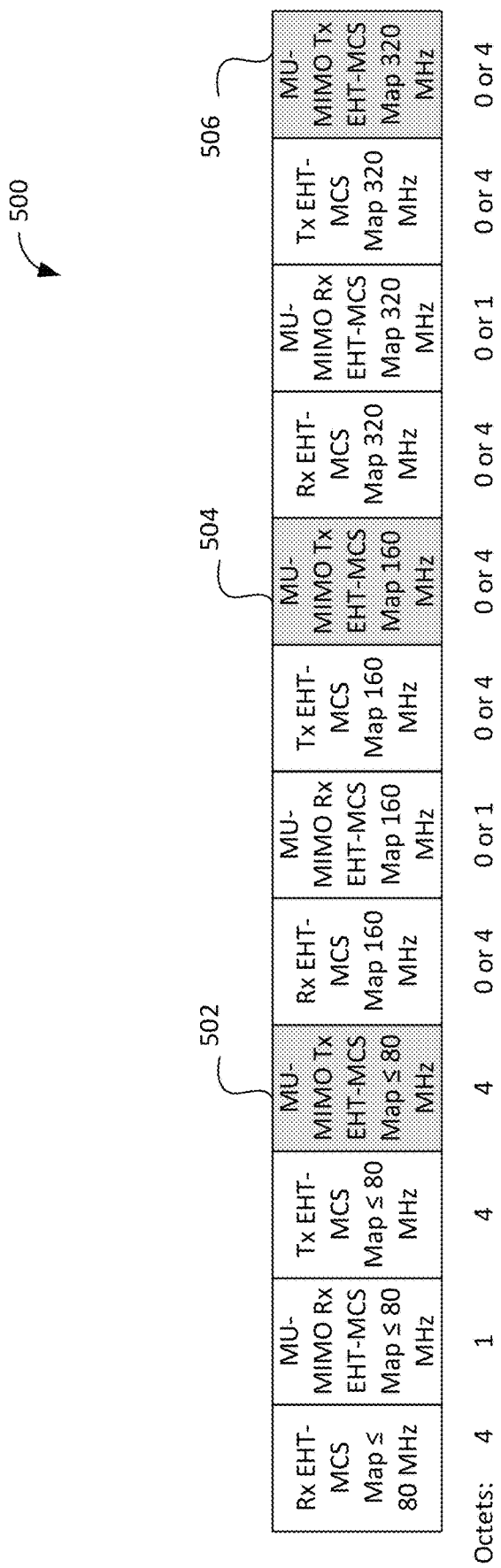
FIG. 5 illustrates a Supported EHT-MCS and NSS Set field format, according to an embodiment.

FIG. 5 illustrates a Supported EHT-MCS and NSS Set field format 500 according to an embodiment. Three subfields have been added in format 500 to communicate the MU-MIMO Tx EHT-MCS Map information. Subfield 502, MU-MIMO Tx EHT-MCS Map≤80 MHz; subfield 504, MU-MIMO Tx EHT-MCS Map 160 MHz; and subfield 506, MU-MIMO Tx EHT-MCS Map 320 MHz. Subfield 502 is for bandwidth (BW) less than or equal to 80 MHz, subfield 504 is for BW equal to 160 MHz, and subfield 506 is for BW of 320 MHz. The size of each octet may vary depending on the actual supported maximum MCS. In the example of FIG. 5, three subfields have been added to the Supported EHT-MCS and NSS Set field format 500 for different bandwidths. However, in other embodiment, there may be more or less subfields added. For example, if two subfields are added, one may be used for BW≤160 MHz while the other may be used for BW=320 MHz.

FIG. 6 illustrates a detailed format 600 for the MU-MIMO Tx EHT-MCS Map subfields 502, 504, and 506 as illustrated in FIG. 5, according to an embodiment. There is a separate field for each spatial stream (SS) required which may vary depending on the application. In this example, 16 SS are supported. The bit size of each Max EHT-MCS for a certain SS can be determined based on the number of Maximum Supportable MCS for that SS. An AP 102 or STA 104 may support any number of MCS for different SSs. However, this may be limited to a smaller number due to network, hardware, software, or a combination of factors. In particular, some STAs 104-106 may be limited to four MCS per SS.

The MU-MIMO Tx EHT-MCS Map format 600 includes one field for each spatial stream of which field 602 is given as an example. Field 602 is a 2 bit field that allows four different values to be defined as the Max EHT-MCS for any SS. Other fields in format 600 are similar. The number of bits in each field of format 600 may support all MCS of an AP 102 or STA 104, or a smaller subset of the supported MCS. In this embodiment, the Maximum Supportable MCS is limited to four, and thus, the bit size of each Maximum EHT-MCS for each SS can be 2 bits as shown in FIG. 6. However, depending on the number of Maximum supportable MCS, the bit size of each subfield may vary and require fewer or more bits. For example, 2 MCS may be encoded with 1 bit. Using 3 bits allow for 8 MCS to be encoded and using 4 bits allow for up to 16 MCS to be encoded for a SS. As the byte size of the MU-MIMO Tx EHT-MCS Map is determined by each of the fields in format 600, varying the size of bit fields of format 600 will vary the size of format 500 in FIG. 5 as well. This allows for the MU-MIMO Tx Capability of each STA 104 or AP 102 for the maximum supportable MCS to be communicated.

Figure 7:
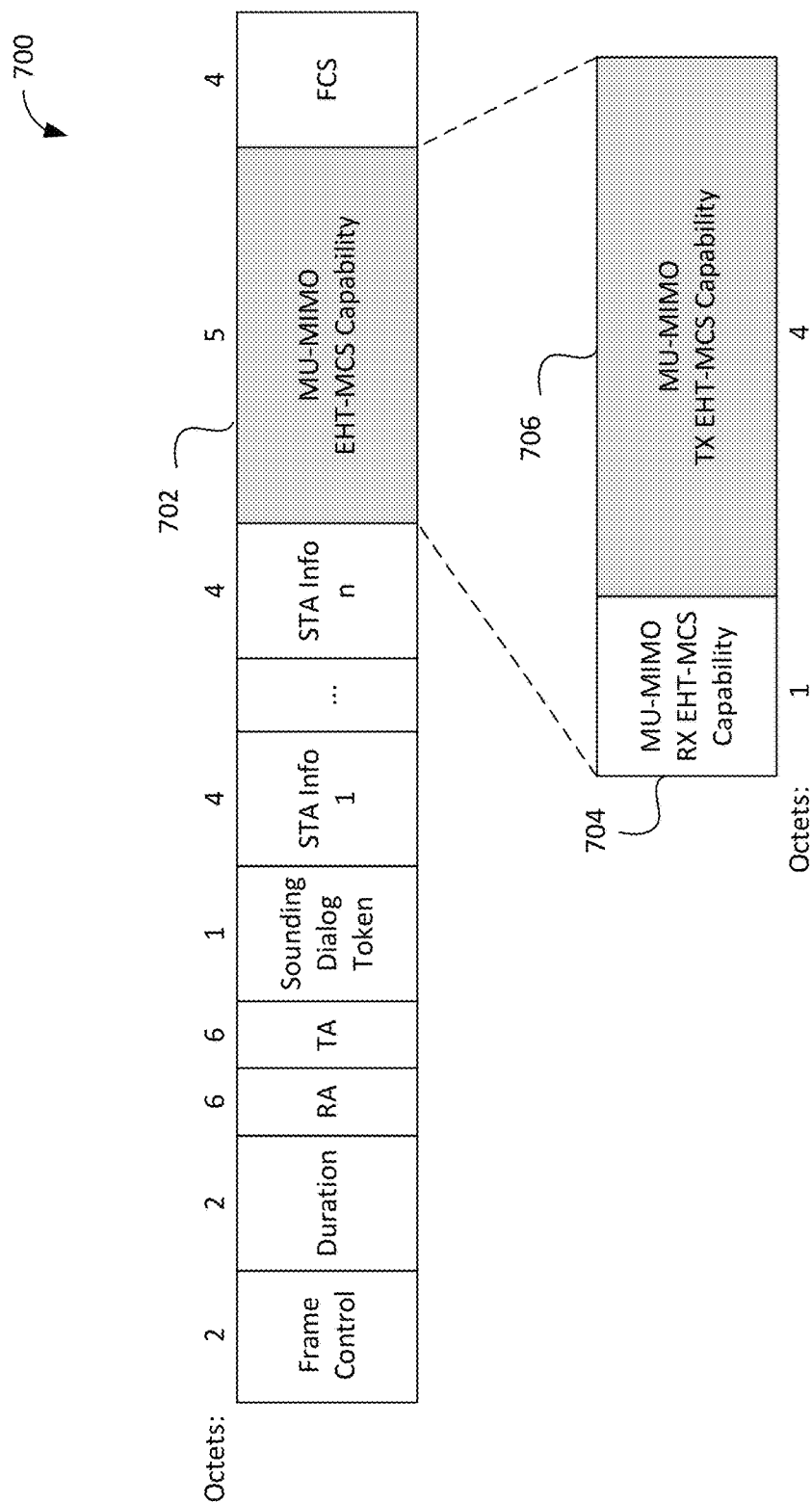
FIG. 7 illustrates an MU-MIMO EHT-MCS Capability Indication through an NDPA, according to an embodiment.

FIG. 7 illustrates the use of a frame 700, such as a null data packet announcement (NDPA) frame or a channel state information (CSI) feedback (FB) action frame, which may be used to communicate the indication of MU-MIMO MCS capability between an AP 102 and a STA 104. Information such as single user (SU) MIMO MCS capability is already indicated through the Beacon frame and Association Response frame. Furthermore, the BW of the NDPA frame is indicated through the Service field when the NDPA is transmitted in a non-high throughput (HT) duplicate format. Therefore, MU-MIMO MCS capability does not have to be specified for different bandwidths such as for 80 MHz, 160 MHz and 320 MHz as illustrated in format 500 of FIG. 5.

FIG. 7 illustrates a high efficiency (HE) NDPA frame format 700, according to an embodiment. The format 700 includes a 5 octet subfield 702 to indicate the MU-MIMO EHT-MCS capability of AP 102 or STA 104. The MU-MIMO EHT-MCS capability subfield 702 further includes a 1 byte MU-MIMO RX EHT-MCS capability field 704 and a 4 byte MU-MIMO TX EHT-MCS capability field 706 after the end of all the STA Info fields and before the frame check sequence (FCS). The exact position of the MU-MIMO EHT-MCS capability subfield 702 may vary within frame 700 in different embodiments.

In embodiments such as illustrated in FIG. 7 an AP 102 or a STA 104 may communicate both its receiver and transmitter capabilities to each other. AP 102 may utilize a Beacon frame, which is transmitted by APs. STA 104 may utilize an Association Response frame, which is transmitted by STAs as part of an association process.

In embodiments, the format of MU-MIMO TX EHT-MCS capability field 706 may be the same format 600 as illustrated in FIG. 6. MU-MIMO RX EHT-MCS capability field 704 may have a similar format. In this particular example, the 4 octet MU-MIMO TX EHT-MCS capability field 706 may allow for the indication of Max EHT-MCS for 16 SSs, with 2 bits allocated per SS. Similarly, the 1 octet MU-MIMO RX EHT-MCS capability field 704 may allow for the indication of Max EHT-MCS for 4 SSs.

Figure 8:
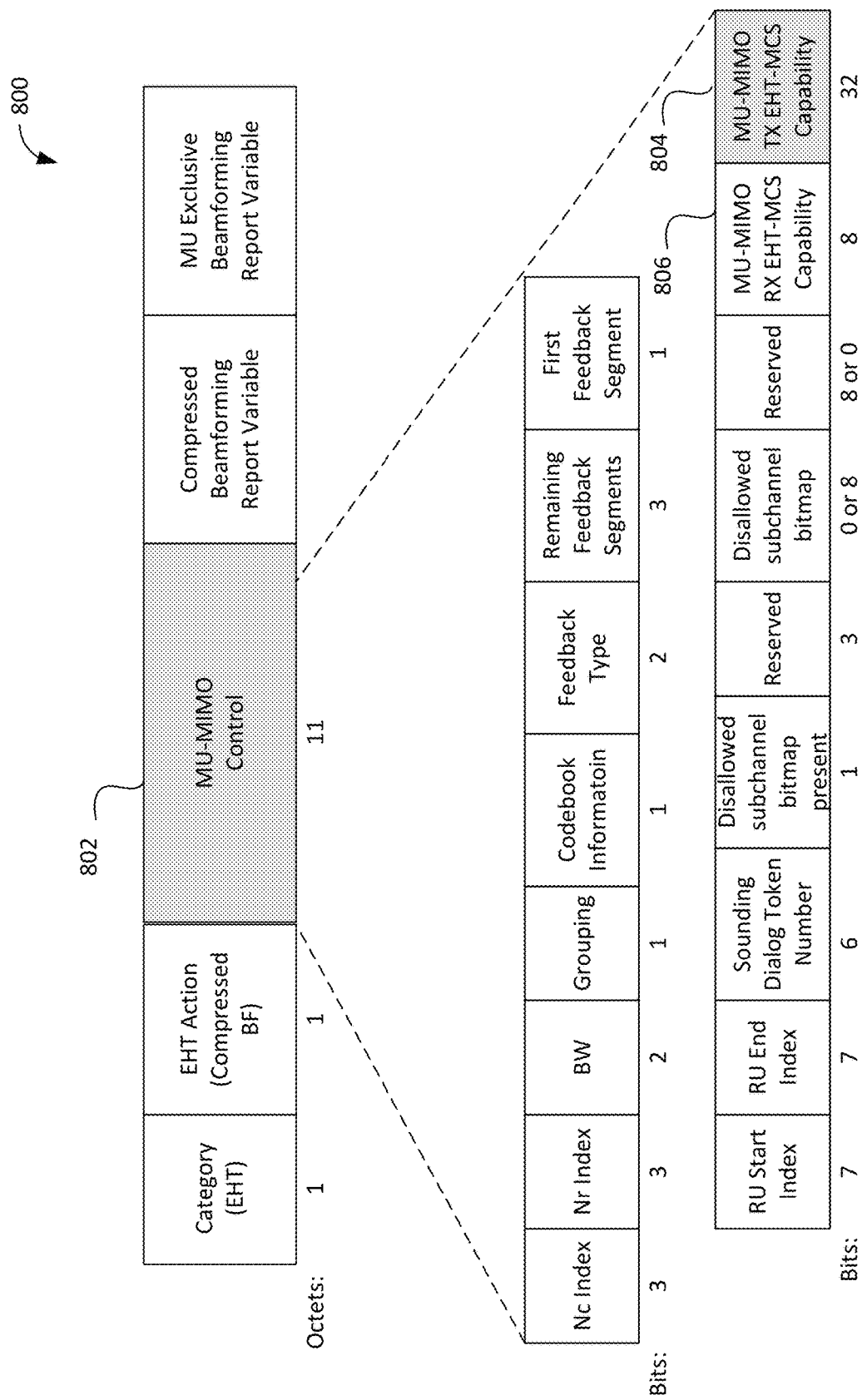
FIG. 8 illustrates an MU-MIMO EHT-MCS Capability Indication in an EHT Compressed BF Action Frame, according to an embodiment.

With reference to FIG. 8, embodiments allow for the MU-MIMO EHT-MCS capability can be indicated in an Extremely High-Throughput (EHT) Compressed Beam Forming (BF) Action frame 800. An MU-MIMO TX EHT-MCS capability field 804 may be added to the MU-MIMO control field of the frame 800. The MU-MIMO TX EHT-MCS capability field 804 may be 32 bits, corresponding to a number of spatial streams (NSS) of 16, using 2 bits per SS. MU-MIMO TX EHT-MCS capability field 804 may use the same format 600 of FIG. 6. The MU-MIMO RX EHT-MCS capability field 806 may be 8 bits long to support an NSS of 4 and may use a truncated version of format 600 of FIG. 6.

As noted above, the MU-MIMO EHT-MCS Capability 706 and 804 does not have to be indicated for all the BW cases as it is already indicated in the Beacon frame or in the Association Response frame.

Figure 9:
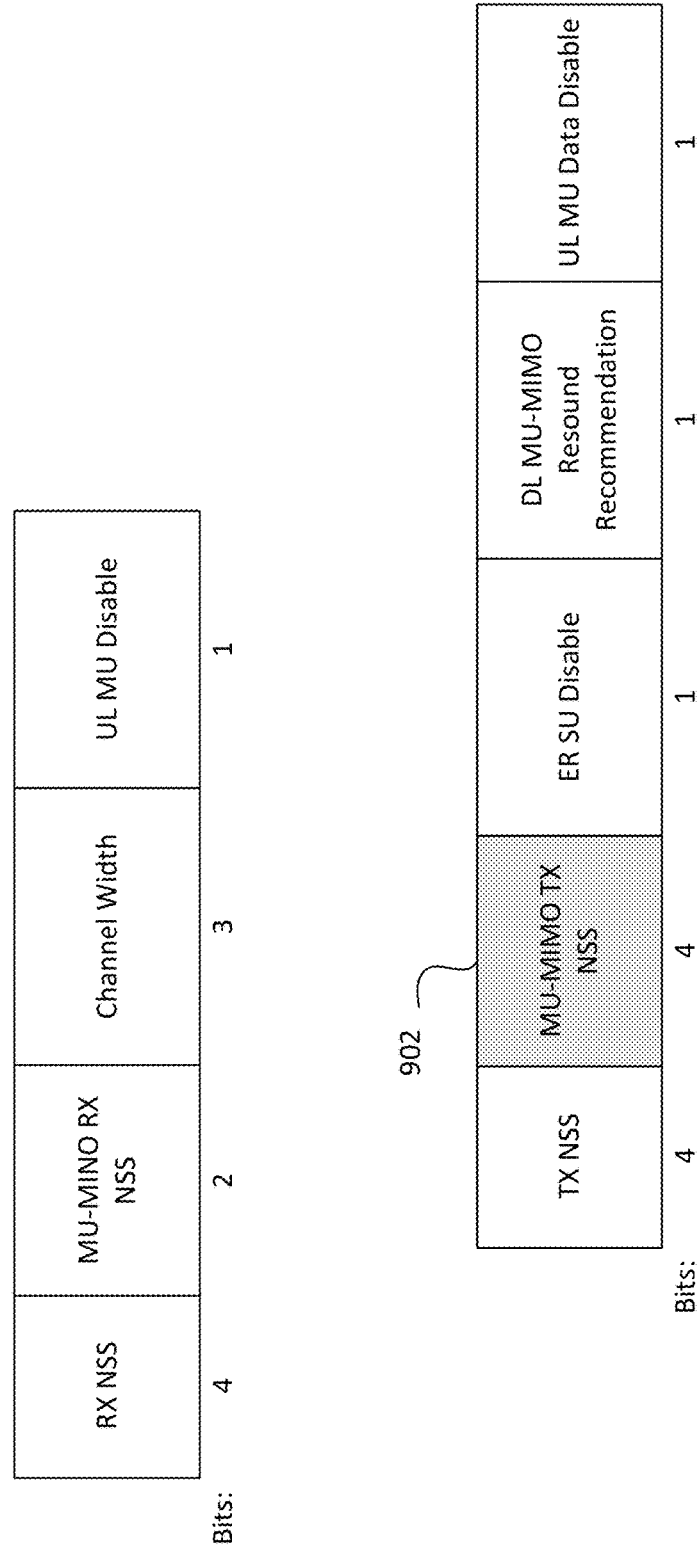
FIG. 9 illustrates an Extended OM Control field, according to an embodiment.

FIG. 9 illustrates an embodiment where the maximum supportable NSS may be indicated in an extended Operating Mode (OM) field 900 of an A-control field. An additional MU-MIMO TX NSS subfield 902 has been added to communicate the maximum supportable TX NSS for the MU-MIMO in the Extended OM Control field. FIG. 9 illustrates an example of this Extended OM Control format. As illustrated, the MU-MIMO TX NSS field 902 is a 4 bit field located between the TX NSS field and the ER SU Disable field, however, the position and the bit size of MU-MIMO TX NSS subfield 902 may vary within the OM field 900. This allows the maximum supportable MU-MIMO TX NSS to be indicated in the OM Control field.

Figure 10:
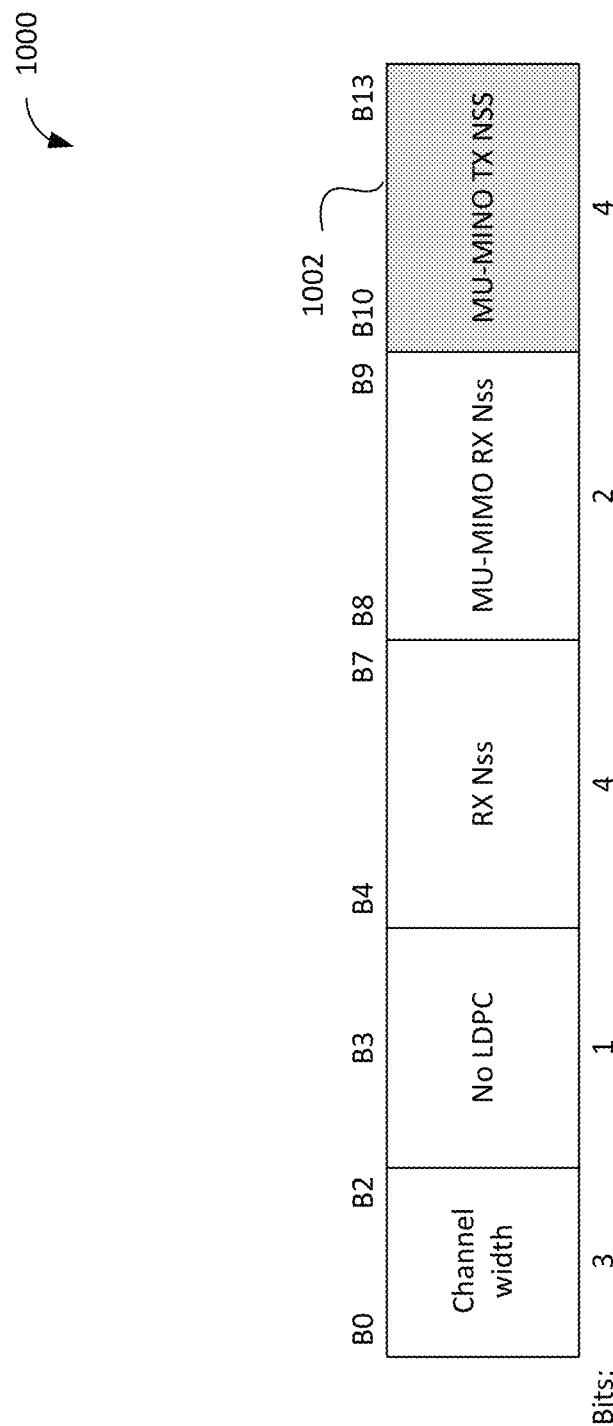
FIG. 10 illustrates an Extended Operation Mode in accordance with an embodiment of the present invention.

FIG. 10 illustrates another embodiment where the maximum supportable NSS may be indicated in another extended Operating Mode (OM) field 1000 of a management frame. An additional MU-MIMO TX NSS subfield 902 has been added to communicate the maximum supportable TX NSS for the MU-MIMO in the extended OM Control field. FIG. 10 illustrates an example of this extended OM Control format. As illustrated, the MU-MIMO TX NSS field 1002 is a 4 bit field located after the MU-MIMO RX NSS field, however, the position and the bit size of MU-MIMO TX NSS subfield 1002 may vary within the OM field 1000.

In accordance with embodiments of the present invention, there is provided a method of communication between a first node and a second node operating in a communications network. The method includes sending, by the first node, to the second node, a first transmission to configure a communication channel between the first node and the second node. The first transmission including a first frame including a first capability indicator. The first capability indicator indicates a first multi-user (MU)-MIMO capability of a transmitter of the first node. The first MU-MIMO capability includes a first Modulation and Coding Scheme (MCS) processable by the first node or a first number of spatial streams (NSS) processable by the first node.

This provides the technical benefit of allowing for the MU-MIMO Tx Capability, such as the for the maximum supportable MCS, of a network node such as a STA or AP to be communicated from a transmitting node to a receiving node.

Further embodiments include receiving, by the first node, a second transmission from the second node. The second transmission includes a second frame including a second capability indicator for indicating a second MU-MIMO capability of a transmitter of the second node. The second MU-MIMO capability includes a second Modulation and Coding Scheme (MCS) processable by the second node or a second number of spatial streams (NSS) processable by the second node.

This provides the technical benefit of allowing for the MU-MIMO Tx Capability, such as the for the maximum supportable MCS, of a network node such as a STA or AP to be communicated bidirectionally between two network nodes.

In further embodiments, the first frame comprises a Beacon frame, the first node is an access point (AP), and the second node is a station (STA).

In further embodiments, the first frame comprises an Association Response frame, the first node is a station (STA), and the second node is an access point (AP).

In further embodiments, the first frame comprises a null data packet announcement (NDPA) frame.

In further embodiments, the first frame comprises a channel state information (CSI) feedback (FB) action frame.

In further embodiments, the first frame comprised an Extremely High-Throughput (EHT) Compressed Beam Forming (BF) Action frame.

In further embodiments, the first frame comprises a channel state information (CSI) feedback (FB) action frame.

In further embodiments, the first MU-MIMO capability includes a transmitter MCS for a spatial stream.

In accordance with embodiments of the present invention, there is provided a network node configured to communicate with a second network node operating in a communications network. The network node includes a processor coupled to a network interface and a computer readable storage medium. The storage medium stores instructions executable by the processor to send to the second node, a first transmission to configure a communication channel between the network node and the second node. The first transmission includes a first frame including a first capability indicator. The first capability indicator indicates a first multi-user (MU)-MIMO capability of a transmitter of the network node. The first MU-MIMO capability includes a first Modulation and Coding Scheme (MCS) processable by the network node or a first number of spatial streams (NSS) processable by the network node.

In an embodiment, the storage medium store instructions executable by the processor to further instruct the network node to receive, a second transmission from the second node. The second transmission includes a second frame including a second capability indicator for indicating a second MU-MIMO capability of a transmitter of the second node. The second MU-MIMO capability includes a second Modulation and Coding Scheme (MCS) processable by the second node or a second number of spatial streams (NSS) processable by the second node.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of communication between a first node and a second node operating in a communications network, the method comprising:
sending, by the first node, to the second node, a first transmission to configure a communication channel between the first node and the second node, the first transmission including a first frame including a first capability indicator, the first capability indicator indicating a first multi-user multi-input multi-output (MU-MIMO) capability of a transmitter of the first node, the first MU-MIMO capability including a first Modulation and Coding Scheme (MCS) processable by the first node or a first number of spatial streams (NSS) processable by the first node.

2. The method of claim 1, further comprising:
receiving, by the first node, a second transmission from the second node, the second transmission including a second frame including a second capability indicator for indicating a second MU-MIMO capability of a transmitter of the second node, the second MU-MIMO capability including a second MCS processable by the second node or a second number of spatial streams NSS processable by the second node.

3. The method of claim 1, wherein the first frame comprises a Beacon frame, the first node is an access point (AP) and the second node is a station (STA).

4. The method of claim 1, wherein the first frame comprises an Association Response frame, the first node is a station (STA) and the second node is an access point (AP).

5. The method of claim 1, wherein the first frame comprises a null data packet announcement (NDPA) frame.

6. The method of claim 1, wherein the first frame comprises a channel state information (CSI) feedback (FB) action frame.

7. The method of claim 1, wherein the first frame comprises an Extremely High-Throughput (EHT) Compressed Beam Forming (BF) Action frame.

8. The method of claim 1, wherein the first frame comprises a compressed beamforming action (CBA) frame.

9. The method of claim 2, wherein the first capacity indicator or the second capacity indicator includes one of a minimum mean square error (MMSE) detection algorithm, a maximum-likelihood detection (MLD) algorithm, or a sphere decoding (SD) algorithm.

10. The method of claim 1, wherein the first MU-MIMO capability includes a transmitter MCS for a spatial stream.

11. A network node configured to communicate with a second network node operating in a communications network, the network node comprising:
a processor coupled to a network interface and a computer readable storage medium, the storage medium storing instructions executable by the processor to:
send, to the second network node, a first transmission to configure a communication channel between the network node and the second network node, the first transmission including a first frame including a first capability indicator, the first capability indicator indicating a first multi-user multi-input multi-output (MU-MIMO) capability of a transmitter of the network node, the first MU-MIMO capability including a first Modulation and Coding Scheme (MCS) processable by the network node or a first number of spatial streams (NSS) processable by the network node.

12. The network node of claim 11, wherein the storage medium store instructions executable by the processor to:
receive, a second transmission from the second node, the second transmission including a second frame including a second capability indicator for indicating a second MU-MIMO capability of a transmitter of the second node, the second MU-MIMO capability including a second MCS processable by the second node or a second NSS processable by the second node.

13. The network node of claim 11, wherein the first frame comprises a Beacon frame, the first node is an access point (AP) and the second node is a station (STA).

14. The network node of claim 11, wherein the first frame comprises an Association Response frame, the first node is a station (STA), and the second node is an access point (AP).

15. The network node of claim 11, wherein the first frame comprises a null data packet announcement (NDPA) frame.

16. The network node of claim 11, wherein the first frame comprises a channel state information (CSI) feedback (FB) action frame.

17. The network node of claim 11, wherein the first frame comprised an Extremely High-Throughput (EHT) Compressed Beam Forming (BF) Action frame.

18. The network node of claim 11, wherein the first frame comprises compressed beamforming action (CBA) frame.

19. The network node of claim 11, wherein the first MU-MIMO capability includes a transmitter MCS for a spatial stream.

20. The network node of claim 12, wherein the first capacity indicator or the second capacity indicator includes one of a minimum mean square error (MMSE) detection algorithm, a maximum-likelihood detection (MLD) algorithm, or a sphere decoding (SD) algorithm.

* * * * *